(12) United States Patent
Hannu

(10) Patent No.: US 6,665,387 B2
(45) Date of Patent: Dec. 16, 2003

(54) METHOD AND APPARATUS FOR PERFORMING A CHARGING LIMIT CONTROL

(75) Inventor: Kasvi Hannu, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/753,483

(22) Filed: Jan. 3, 2001

(65) Prior Publication Data

US 2002/0126810 A1 Sep. 12, 2002

Related U.S. Application Data

(63) Continuation of application No. PCT/EP98/04404, filed on Jul. 15, 1998.

(51) Int. Cl.[7] .............................................. H04M 15/00
(52) U.S. Cl. .............................. 379/114.16; 379/114.01; 379/114.17; 379/114.2
(58) Field of Search ....................... 379/114.09, 112.01, 379/112.04, 111, 115.01, 121.01, 114.15, 114.16, 114.17, 114.2, 114.28, 144.01, 114.01

(56) References Cited

U.S. PATENT DOCUMENTS

| | | | |
|---|---|---|---|
| 5,109,401 A | | 4/1992 | Hattori et al. |
| 5,353,335 A | | 10/1994 | D'Urso et al. |
| 5,559,871 A | * | 9/1996 | Smith |
| 5,677,945 A | | 10/1997 | Mullins et al. |
| 5,790,643 A | * | 8/1998 | Gordon et al. .............. 379/119 |
| 5,825,863 A | * | 10/1998 | Walker |
| 5,898,915 A | * | 4/1999 | Reininghaus et al. |
| 5,995,822 A | * | 11/1999 | Smith et al. |
| 6,058,173 A | * | 5/2000 | Penfield et al. ........ 379/114.17 |
| 6,188,752 B1 | * | 2/2001 | Lesley ................... 379/114.16 |
| 6,192,117 B1 | * | 2/2001 | Stephan ................. 379/114.18 |
| 6,249,573 B1 | * | 6/2001 | Hudson ................... 379/114.2 |

FOREIGN PATENT DOCUMENTS

| | | |
|---|---|---|
| EP | 0705019 A2 | 4/1996 |
| EP | 0746135 A2 | 12/1996 |

* cited by examiner

*Primary Examiner*—Curtis Kuntz
*Assistant Examiner*—Barry W Taylor
(74) *Attorney, Agent, or Firm*—Squire, Sanders & Dempsey, L.L.P.

(57) ABSTRACT

A method and apparatus for performing a charging limit control in a telecommunication switching network is disclosed, wherein a charging limit tile is provided comprising a plurality of subscriber-specific charging limit records. The charging limit control is performed by using a record index in order to access the subscriber-specific charging limit. Thus, the charging limit control is adaptable to different charging limit values of different call types, which can be provided in the corresponding subscriber-specific charging limit record. Moreover, the subscriber-specific charging limit record may comprise subrecords used for providing different charging limit values for different call types or services, wherein own charging limits can be allocated to different call types.

7 Claims, 4 Drawing Sheets

METHOD AND APPARATUS FOR PERFORMING A CHARGING LIMIT CONTROL

This application is a continuation of international application serial number PCT/EP98/04404, filed Jul. 15, 1998.

FIELD OF THE INVENTION

The present invention relates to a method and apparatus for performing a charging limit control in a switched telecommunication network so as to ensure that an agreed charging limit will not be exceeded within a predetermined time period.

BACKGROUND OF THE INVENTION

In general, known methods and apparatuses for prepayment of telecommunication connections between first and second telecommunication devices involve storing monetary value data representative of a prepaid, e.g. deposited in a centralized storage device, amount of monetary value available for payment of telecommunication connections in the telecommunication switching network.

At the initiation of the first telecommunication device, a telecommunication connection is established between the first and second telecommunication devices so that a telecommunication process can be conducted therebetween. The telecommunication connection between the first and second telecommunication devices is terminated in response to a termination of the telecommunication process. The time duration of the telecommunication connection is measured. The cost of the telecommunication connection is computed using the measured time duration and applicable prepaid rate data. The stored monetary value data is processed to indicate a decrement in the available prepaid monetary value, which decrement is essentially equal to the computed cost of the telecommunication connection.

The U.S. Pat. No. 5,353,335 discloses a prepaid telephone system provided in a public switched telephone network, wherein a telephone user buys a predetermined amount of a service beforehand and receives a card imprinted with a unique account number. A plurality of tall free access telephone numbers allows the user to access the prepaid telephone system. Each of those telephone numbers causes the prepaid system to interact with the user. The user is prompted to enter his or her card number. The authenticity of the number and the available credit is determined.

If there is a certain minimum amount of credit available, the user is prompted to enter the phone number of a desired party. If the user has enough available credit to pay for at least a minimal amount of calling time, the call is completed. A timer is set with an amount of calling time permitted by the available balance. The timer runs during the course of the phone call and the call is disconnected when the timer runs out. If the call is ended prior to the timer running out, a new available balance is computed in the light of the time remaining on the timer. The user can make additional phone calls using the new available credit balance.

Furthermore, a prepaid telecommunication service is described in the U.S. Pat. No. 5,677,945, wherein credit or debit cards are used in a telecommunication network including a central data base. The system monitors card balances while blocking multiple use of card balances and sends warning messages to subscribers on card balances which approach a threshold amount. Upon initiation of a telephone call, a subscriber card balance corresponding to the subscriber's credit or debit account is retrieved from the central data base. A switching station monitors the telephone call and initiates an alarm when the call time approaches a threshold amount specified for the card balance. The system announces to the subscriber and/or blocks the termination of the call when the threshold amount has been exceeded and a further limit specified for the card balance has been reached.

Thus, according to the known prepaid systems, one subscriber has only one charging limit, or the limit is service-specific if the subscriber has no own limit.

Moreover, several different implementations are required if existing methods of handling a subscriber data are used for achieving a flexible subscriber-based charging limit.

SUMMARY OF THE INVENTION

It is an object of the present invention to provide a simple method and apparatus for performing charging limit control, which can be adapted to different charging limit values of different calls.

This object is achieved by a method for performing charging limit control in a telecommunication switching network, comprising the steps of:
  providing a charging limit file comprising a plurality of subscriber-specific charging limit records;
  setting a subscriber-specific charging limit by writing limit date to the charging limit file; and
  using a record index for accessing the subscriber-specific charge limit during a call.

Furthermore, the above object is achieved by an apparatus for performing charging limit control in a telecommunication switching network, comprising:
  storing means for storing a charging limit file comprising a plurality of subscriber-specific charging limit records; and control means for setting a subscriber-specific charging limit by writing limit data to the charging limit file,
  wherein said control means is arranged to access the subscriber-specific charging limit during a call by using a record index.

Since a charging limit file is provided comprising subscriber-specific charging limit records accessed by record indices, the charging limit control is easily adaptable to different charging limit values of different call types, by writing corresponding charging limit values into the charging limit file and storing corresponding record indices in subscriber data files. Moreover, different accesses like direct subscribers, private branch exchanges and indirect subscribers can use the same method, since the charging limit file can be centrally accessed.

Accordingly, end users are able to define a desired upper billing limit for a predetermined time period, e.g. one month, which has to be ensured by the network operator.

Since, therefore, limit counting and checking can be performed centrally, specific limit counters for each subscriber data are no longer required.

Preferably, the subscriber-specific charging limit record may comprise a plurality of subrecords, each including information about an initial limit value, a remaining value and a next time when the remaining value should be initialized to the initial value, wherein the subrecords are used for charging limits of different call types and are accessed on the basis of subscriber data.

The provision of a plurality of subrecords within each subscriber-specific charging limit record provides the advantage that own charging limits can be allocated to different call types and can be accesses by providing a corresponding index in the subscriber data. Thus, a flexible charging limit control can be established.

The subrecords comprising different charging limit values preferably can be accessed in dependence on a destination information provided in the subscriber data. Thus, the charging limit can be chosen with regard to the destination of the call, so that different charging limits can be defined for different services.

Moreover, one of the subrecords can be used as a default limit value, wherein the default limit value is used for calls which do not have own charging limits. Thereby, the default limit value can be used, in case a destination having a specific charging limit has been chosen by a subscriber having only a default limit in use.

The updating of the initial value preferably can be performed in such a way that every time the remaining value is read, the next initialization time is checked, wherein the remaining value is set to the initial value and the next time to initialize is set, when the initialization time has been achieved. Thereby, the initial value does not have to be updated for all subscribers at the same time, so that the update load of the apparatus can be decreased.

Preferably, the control means may comprise a call control means of a switching system. Thereby, a switch-based charging limit control can be performed, which may also be implemented by small operators who do not have access to an expensive IN-based prepaid service. Moreover, in known IN-based prepaid-services, one subscriber has only one charging limit, or the limit is service-specific, so that the charging limit is always the same and cannot be adapted to specific destinations of a call.

Further preferred developments of the present invention are defined in the dependent claims.

BRIEF DESCRIPTION OF THE DRAWINGS

In the following, the invention will be described in greater detail on the basis of a preferred embodiment with respect to the accompanying drawings, wherein.

DESCRIPTION OF THE PREFERRED EMBODIMENT

Figure 1:
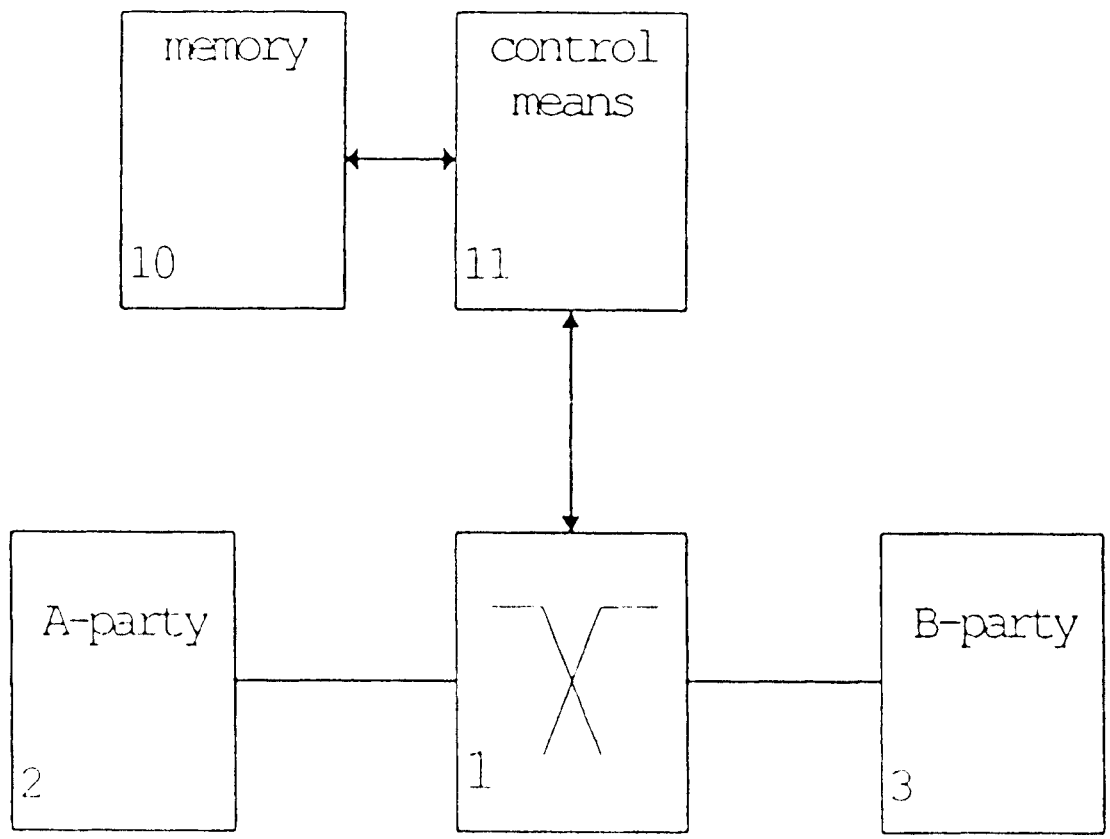
FIG. 1 shows a block diagram of a switching system for a telecommunication switching network, in which the present invention is used.

A preferred embodiment of the present invention is shown in FIG. 1, wherein a switching means 1 of a telecommunication switching network is connected between an A-party 2 and a B-party 3 as examples of a plurality of parties connected to the switching means 1. The switching means 1 is controlled by a control means 11 which performs a call control for controlling telephone calls, a signaling service for handling the connection to the A-party 2 and the B-party 3, and basic switching services which form an interface between the operator and the switching means 1.

Moreover, the control means 11 performs a charging limit control in order to handle a subscriber's charging limit, wherein it is checked during a call, whether the subscriber's specific limit has been achieved or not. For this purpose, a memory 10 is provided in which a charging limit file used for checking charging limits of subscribers is stored.

Figure 2:
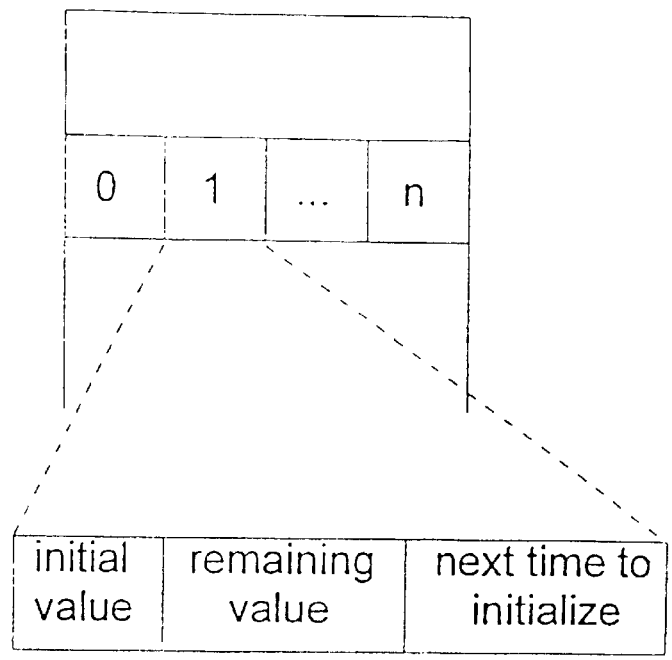
FIG. 2 shows a principle diagram of a charging limit file according to a preferred embodiment of the present invention.

FIG. 2 shows a charging limit file according to the present invention, wherein a plurality of charging limit records are stored, which consist of 0 . . . n subrecords, each including an information about an initial value (e.g. subscriber's monthly limit), a remaining value and a next time when the remaining value should be initialized to the initial value. The remaining value indicates the value of remaining units prepaid by the subscriber, and the time period corresponding to the next time to initialize depends on the time period prepaid by the subscriber. The subrecord 0 may comprise default settings, to be used for calls which do not have own charging limits. The other subrecords 1 . . . n are used for specific charging limit values which can be set by the control means 11 in accordance with specific charging limit values of the subscriber defined for specific calls or services.

In particular, the next initialization time is checked every time a remaining value is read by the control means 11. If a corresponding predetermined initialization time has been achieved, the remaining value is set to the initial value and the value of the next time to initialize is set, for example, to the sum of the old value plus an exchange specific value corresponding to the period of the subscriber's prepayment.

The values written into the subrecords may depend on a destination of the call. In this case, the subrecords index may be derived from the destination data of the call which is to be switched by the switching means 1.

Figure 3:
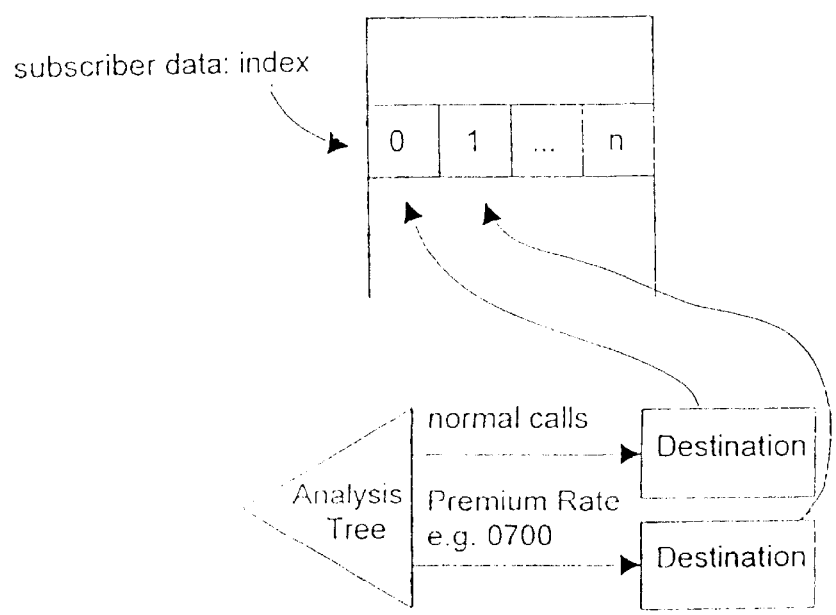
FIG. 3 shows a diagram used for explaining an access to a charging limit record and corresponding subrecords in the charging limit file according to a preferred embodiment of the present invention.

FIG. 3 shows a diagram for explaining the allocation between charging limit values and different calls. Subscriber data used for call control are stored in the memory 10. The subscriber data comprise index data specifying the corresponding charging limit record allocated to a subscriber. Based on the index data, the control means 11 reads the charging limit record of a specific subscriber. Moreover, based on an analysis tree of a call control procedure, the destination of a current call is determined, which may be a normal call or a call at premium rate (e.q. 0700). The obtained destination information provides a predetermined relation to the subrecords of the subscriber's charging limit record. The content of the subrecords depends on the desired settings of the subscriber. For example, if a destination has been derived, which indicates a type 1 subrecord, but the corresponding subscriber has only a default limit in use (subrecord 0), only the default limit is used, since the subscriber did not specify any other charging limits for specific calls. Thus, default charging limit is used for calls which do not have own charging limits. The destination's "call type" value is set in the known manner as performed for other destination information.

Figure 4:
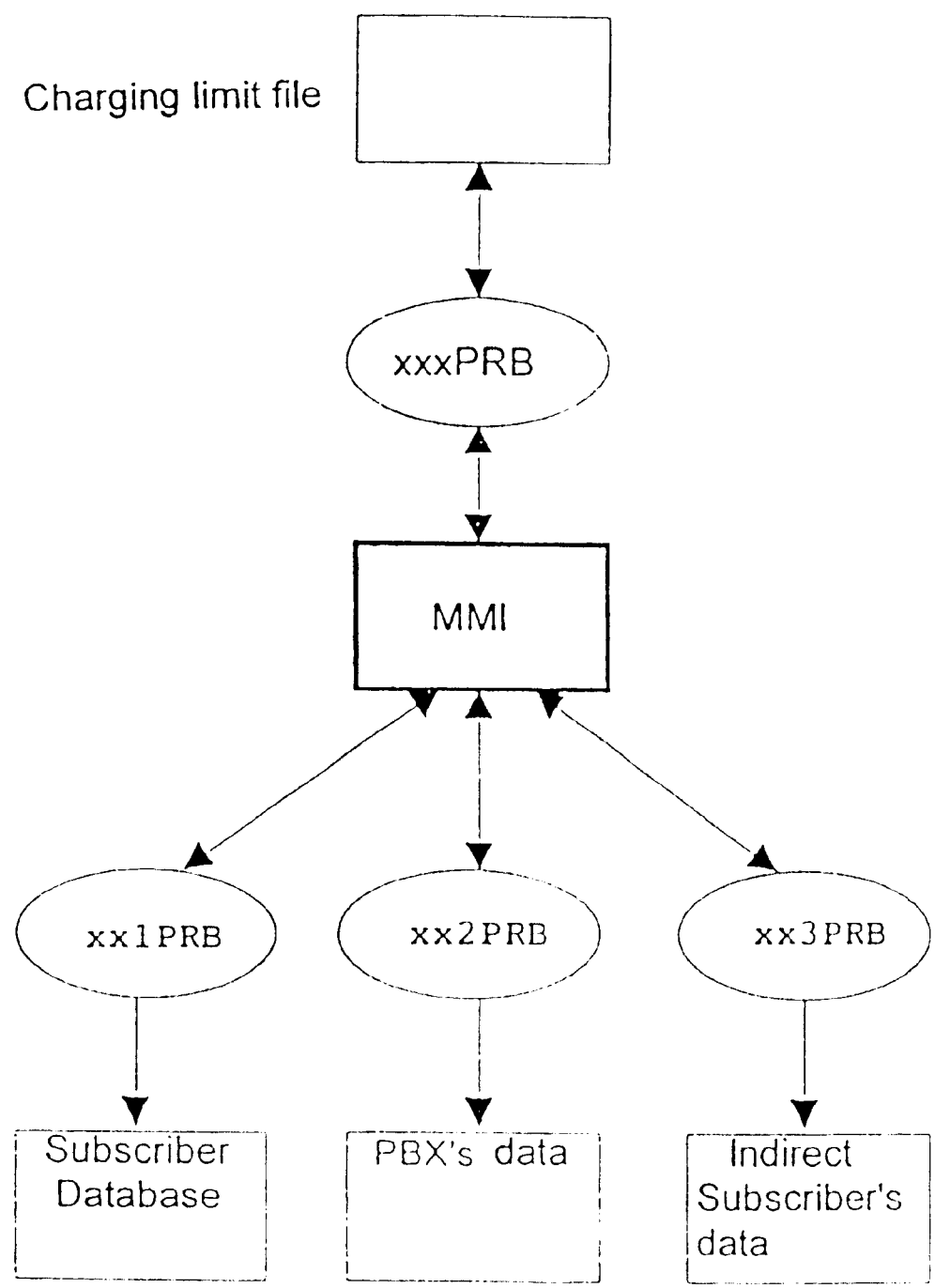
FIG. 4 shows a principle block diagram of a charging limit control according to the preferred embodiment of the present invention.

FIG. 4 shows a principle diagram for explaining the charging limit control according to preferred embodiment, wherein an oval-shaped block indicates a software means.

Charging limit data are handled by using a new or existing man machine interface MMI and a new or existing subscriber data base, private branch exchange (PBX) data file and indirect subscriber's data file. Only the index of the charging limit file, which indicates a corresponding charging limit record is updated in the subscriber data file or data base of the corresponding subscriber. When a charging limit is set, e.g. for a PBX subscriber, the MMI provides a corresponding message to a control program block xxxPRB. The control program block xxxPRB searches for a free record on the charging limit file, writes the corresponding limit data to the free record in the file and returns the corresponding records index to the man machine interface MMI. Subsequently, the man machine interface MMI uses a subscriber-specific program block xx2PRB to update the charging limit index in the PBX's data file.

Correspondingly, another subscriber-specific program block xx1PRB is used for updating the subscriber data base and a further subscriber-specific program block xx3PRB for updating the indirect subscriber's data file.

During call control, the control means 11 reads the corresponding subscriber's index of the charging limit file together with the subscriber's data. An index value 0 means that no limit is set. Subsequently, the control means 11 provides the read limit index to a charging control program, which directly reads the corresponding record of the charging limit file.

Figure 5:
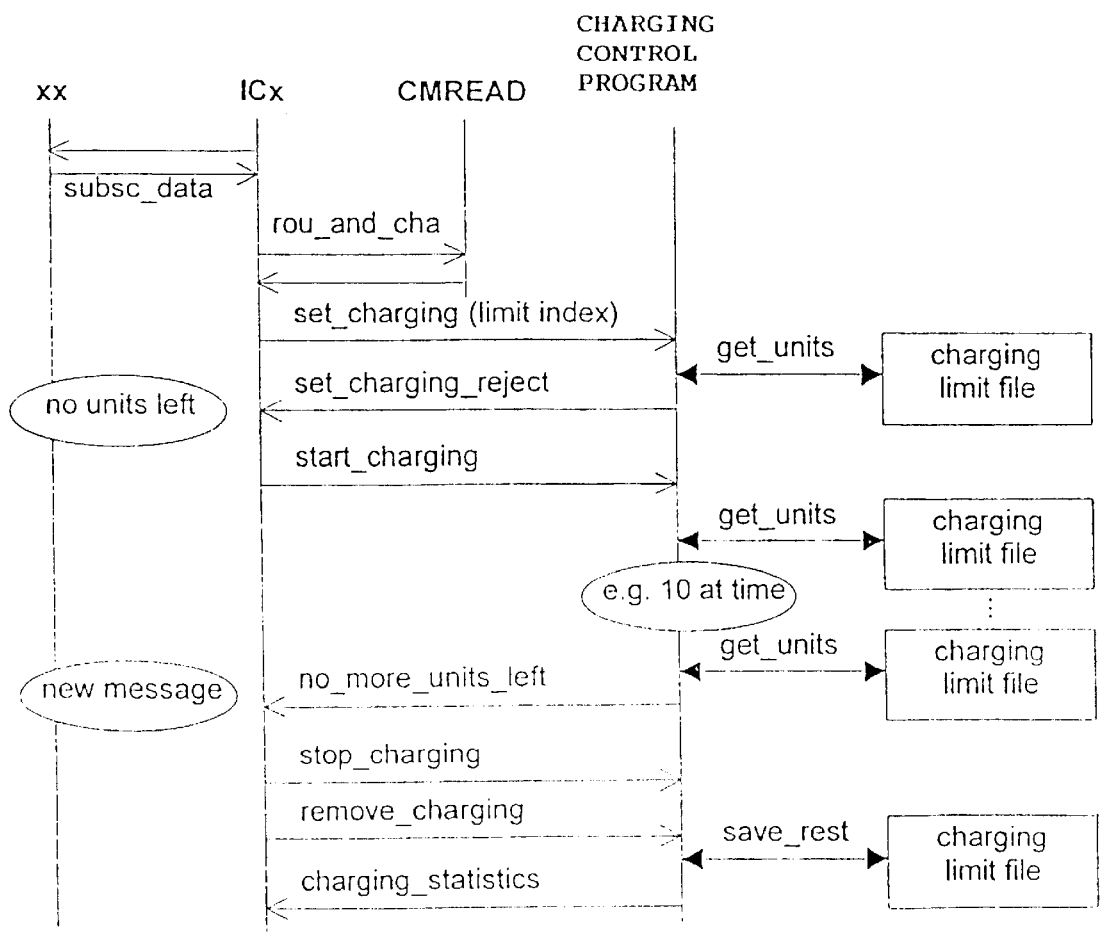
FIG. 5 shows a diagram of a charging limit checking procedure during a call, based on the charging limit control according to the preferred embodiment of the present invention.

FIG. 5 shows a diagram for explaining information flows during the charging limit control according to the preferred embodiment, wherein "xx" indicates a control procedure for obtaining subscriber data, "ICx" a corresponding call control program block, "CMREAD" a control procedure for obtaining routing data. Furthermore, a charging program block is provided for generating charging pulses of the switching means 1 and for collecting charging data received from an outgoing direction.

When a new call is switched by the switching means 1, for example from the A-party 2 to the B-party 3 shown in FIG. 1, subscriber data are transferred to the corresponding call control program ICx relating to the A-party 2. The call control program block ICx than exchanges routing and charging data with the control procedure CMREAD which forwards the corresponding charging limit index information to the call control program block ICx. Thereafter, the call control program block ICx provides the charging program block with the charging limit index for the A-party 2 and sets the charging operation. Subsequently, the charging program block reads the charging limit file and obtains the corresponding remaining value of the A-party 2.

In case, no units are left, the charging program block informs the call control program block ICx correspondingly and sets a charging reject. Thus, a corresponding message like "no units left" is sent to the subscriber A-party 2.

In case the remaining value in the charging limit file indicates that enough units are left, the call control program block ICx initiates the start of the charging operation and the charging program block decreases the remaining value at a predetermined rate (e.g. ten units at a time) until the end of the call or until no more units are left. If the remaining value in the charge limit file reaches zero, the charging program block informs the call control program block ICx that no more units are left and a corresponding new message is sent to the A-party 2.

If the call is finished and the remaining value of the charging limit file is not zero, an instruction to stop charging or to remove charging is transferred from the call control program block ICx to the charging program block. Thus, the charging program block writes the remaining unit value as the current remaining value in the corresponding subrecord of the charging limit file. Finally, the charging program block may transfer a statistical charging information to the call control program block ICx, which may be used for generating a charging statistic of the A-party 2.

In case a specific charging limit has been allocated to the called B-party 3, an index value to a corresponding subrecord in the charging limit file is derived by the control procedure CMREAD from the destination information of the subscriber, such that the corresponding subrecord is read by the charging program block.

It should be understood that the above description and the accompanying figures are only intended to illustrate the present invention. Thus, the method and apparatus according to the invention may also be used in network devices other than the described switching means 1, and the program blocks and program could as well be implemented as hardware elements. Moreover, the preferred embodiment of the present invention may vary within the scope of the attached claims.

A method and apparatus for performing charging limit control in a telecommunication switching network is disclosed, wherein a charging limit file is provided comprising a plurality of subscriber-specific charging limit records. The charging limit control is performed by using a record index in order to access the subscriber-specific charging limit record. Thus, the charging limit control is adaptable to different charging limit values of different call types, which can be provided in the corresponding subscriber-specific charging limit record. Moreover, the subscriber-specific charging limit record may comprise subrecords used for providing different charging limit values for different call types or services, wherein own charging limits can be allocated to different call types.

What is claimed is:

1. A method for performing a charging limit control in a telecommunication switching network, the method comprising:

writing limit data to a charging limit file to set a subscriber-specific charging limit; and accessing a subscriber-specific charging limit record during a call via a record index;

using subrecords for charging limits of different call types;

accessing the subrecords on the basis of subscriber data; and checking a next initialization time every time a remaining value is read, wherein when the next initialization time has been reached, the remaining value is set to an initial value and an initialization time is set to a next time to initialize.

2. The method according to claim 1, wherein subscriber data are updated by the record index.

3. The method according to claim 1, wherein the subrecords are accessed dependent upon a destination information provided in the subscriber data.

4. The method according to claim 1, wherein one of the subrecords is used as a default limit value, wherein the default limit value is used for calls which do not have specified charging limits.

5. An apparatus for performing charging limit control in a telecommunication switching network, comprising:

means for storing a charging limit file, the charging limit file comprising a plurality of subscriber-specific charging limit records, each subscriber-specific charging limit record comprising a plurality of subrecords, each subrecord at least comprising charging limits of different call types, information about an initial limit value, a remaining value and a next initialization time, the next initialization value indicating when the remaining value should be initialized to the initial value; and control means for setting a subscriber-specific charging limit, the control means arranged to write limit data to the charging limit file, access the subscriber-specific charging limit record during a call via a record index, and access the subrecords on the basis of subscriber data, wherein the apparatus is adapted to check the next initialization time every time the remaining value is read, to set the remaining value to the initial value in response to the initialization time being reached and to set the initialization time to the next time to initialize.

6. The apparatus according to claim 5, wherein the control means comprises a call control means of a switching system.

7. The apparatus according to claim 6, wherein the call control means is arranged to update the record index in a subscriber data file provided in the means for storing.

* * * * *

UNITED STATES PATENT AND TRADEMARK OFFICE
CERTIFICATE OF CORRECTION

PATENT NO. : 6,665,387 B2  
DATED : December 16, 2003  
INVENTOR(S) : Hannu Kasvi Page 1 of 1

It is certified that error appears in the above-identified patent and that said Letters Patent is hereby corrected as shown below:

<u>Title page,</u>  
Item [75], Inventor, please delete "Kasvi Hannu" and insert therefore  
-- Hannu Kasvi --.

Signed and Sealed this

Twenty-seventh Day of April, 2004

JON W. DUDAS  
*Acting Director of the United States Patent and Trademark Office*